(12) United States Patent
Aseev et al.

(10) Patent No.: US 12,467,818 B2
(45) Date of Patent: Nov. 11, 2025

(54) DETECTING GAS LEAKS FROM IMAGE DATA AND LEAK DETECTION MODELS

(71) Applicant: Schlumberger Technology Corporation, Sugar Land, TX (US)

(72) Inventors: Anatoly Aseev, Menlo Park, CA (US); Andrey Sergeevich Konchenko, Menlo Park, CA (US); Jose R. Celaya Galvan, Sunnyvale, CA (US); Indranil Roychoudhury, Sunnyvale, CA (US); Prasham Sheth, Sunnyvale, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 15 days.

(21) Appl. No.: 18/537,895

(22) Filed: Dec. 13, 2023

(65) Prior Publication Data

US 2024/0219255 A1 Jul. 4, 2024

Related U.S. Application Data

(60) Provisional application No. 63/477,590, filed on Dec. 29, 2022.

(51) Int. Cl.
*G01M 3/04* (2006.01)
*G05B 15/02* (2006.01)
(Continued)

(52) U.S. Cl.
CPC .............. *G01M 3/04* (2013.01); *G05B 15/02* (2013.01); *G06V 10/44* (2022.01); *G06V 10/764* (2022.01);
(Continued)

(58) Field of Classification Search
CPC .................. G06V 10/764; G06V 10/7715
(Continued)

(56) References Cited

U.S. PATENT DOCUMENTS 8,274,402 B1 9/2012 Moses et al.
10,810,858 B2 * 10/2020 Israelsen ................. H04N 5/33
(Continued)

FOREIGN PATENT DOCUMENTS

CN 109712140 B * 1/2021
JP 2015161579 A 9/2015
(Continued)

OTHER PUBLICATIONS

Machine Translation for WO-2020003644-A1, obtained Feb. 2025 (Year: 2025).*
(Continued)

*Primary Examiner* — Robert E Fennema
*Assistant Examiner* — Vi N Tran
(74) *Attorney, Agent, or Firm* — Jeffrey D. Frantz (57) ABSTRACT

A method may include receiving, via one or more processors, a set of image data representative of equipment configured to distribute a gas. The method may then involve determining a type of equipment depicted in the first set of image data, retrieving a leak detection model corresponding to the type of equipment depicted in the first set of image data, and determining that a gas leak is present on the equipment based on the set of image data and the leak detection model. After determining that the gas leak is present, the method may include sending a notification to a computing device in response to detecting the gas leak.

20 Claims, 4 Drawing Sheets

(51) Int. Cl.
*G06V 10/44* (2022.01)
*G06V 10/764* (2022.01)
*G06V 10/77* (2022.01)
*G06V 10/774* (2022.01)
*G06V 10/82* (2022.01)
*G06V 20/52* (2022.01)

(52) U.S. Cl.
CPC ........ *G06V 10/7715* (2022.01); *G06V 10/774* (2022.01); *G06V 10/82* (2022.01); *G06V 20/52* (2022.01)

(58) Field of Classification Search
USPC ........................................................ 700/275
See application file for complete search history.

(56) References Cited

U.S. PATENT DOCUMENTS

| | | | | |
|---|---|---|---|---|
| 11,112,809 | B1* | 9/2021 | Bafaro | G05D 7/0635 |
| 11,833,667 | B2* | 12/2023 | Duke | G06N 3/08 |
| 11,854,366 | B1* | 12/2023 | Thoma | H04Q 9/00 |
| 12,033,357 | B2* | 7/2024 | Spears | G06T 7/90 |
| 2011/0221599 | A1* | 9/2011 | Hogasten | H10F 39/8057 |
| | | | | 348/E17.002 |
| 2020/0243877 | A1* | 7/2020 | Amano | H01M 8/04664 |
| 2020/0320659 | A1* | 10/2020 | Whiting | G01M 3/38 |
| 2021/0264584 | A1* | 8/2021 | Zhang | G06T 7/0004 |
| 2021/0271270 | A1* | 9/2021 | Bafaro | F17D 5/02 |
| 2022/0114373 | A1* | 4/2022 | Westerheide | G06F 18/25 |
| 2023/0177726 | A1* | 6/2023 | Spears | G06V 10/26 |
| | | | | 382/100 |
| 2024/0029232 | A1* | 1/2024 | Korjani | G06V 20/52 |

FOREIGN PATENT DOCUMENTS

| | | | |
|---|---|---|---|
| KR | 20210036173 A | 4/2021 | |
| KR | 20210116097 A | 9/2021 | |
| KR | 102454925 B1 | 10/2022 | |
| WO | WO-2020003644 A1 * | 1/2020 | |
| WO | WO-2021246130 A1 * | 12/2021 | G01M 3/02 |

OTHER PUBLICATIONS

Machine Translation for CN-109712140-B, obtained Feb. 2025 (Year: 2025).*
Travis, Bryan, Manvendra Dubey, and Jeremy Sauer. "Neural networks to locate and quantify fugitive natural gas leaks for a MIR detection system." Atmospheric Environment: X 8 (2020): 100092. (Year: 2020).*
Melo, Roberlanio Oliveira, Marly GF Costa, and Cicero FF Costa Filho. "Applying convolutional neural networks to detect natural gas leaks in wellhead images." IEEE access 8 (2020): 191775-191784. (Year: 2020).*
Machine Translation for WO-2021246130-A1, obtained Aug. 2025 (Year: 2025).*
International Search Report and Written Opinion of International Patent Application No. PCT/US2023/083743, dated Apr. 19, 2024, 9 Pages.
He, et al., "Mask R-CNN", Proceedings Of The IEEE International Conference On Computer Vision, 2017, pp. 2961-2969.
Ravikumar et al., "Are Optical Gas Imaging Technologies Effective For Methane Leak Detection", Environmental Science & Technology, vol. 51, 2017, pp. 718-724.
Wang et al., "Machine Vision for Natural Gas Methane Emissions Detection Using an Infrared Camera", Applied Energy, vol. 257, Jan. 2020, 10 pages.

* cited by examiner

DETECTING GAS LEAKS FROM IMAGE DATA AND LEAK DETECTION MODELS

CROSS-REFERENCE TO RELATED APPLICATION

This application claims priority to and the benefit of U.S. Provisional Patent Application Ser. No. 63/477,590, entitled "DETECTING GAS LEAKS FROM IMAGE DATA AND LEAK DETECTION MODELS," filed Dec. 29, 2022, which is hereby incorporated by reference in its entirety for all purposes.

FIELD OF THE INVENTION

The present disclosure relates to systems and methods for detection and segmentation of methane leakage in infrared image data.

BACKGROUND INFORMATION

Hydrocarbon production facilities such as oil rigs and natural gas supply sites may have to comply with certain laws or regulations intended to reduce emission of environmentally hazardous gases. Detecting a gas leak may involve various types of equipment costing thousands of dollars and requiring constant operator monitoring and assessment. For suppliers and contractors, monitoring equipment and efficiently identifying leaks is a part of ensuring that hydrocarbon facilities comply with environmental rules and regulations intended to minimize carbon emissions. Indeed, an autonomous and cost-effective leak detection system may help reduce harmful gas emissions and increase efficiency of hydrocarbon production facilities.

SUMMARY

A summary of certain embodiments described herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via one or more processors, a set of image data representative of equipment configured to distribute a gas. The method may then involve determining a type of equipment depicted in the first set of image data, retrieving a leak detection model corresponding to the type of equipment depicted in the first set of image data, and determining that a gas leak is present on the equipment based on the set of image data and the leak detection model. After determining that the gas leak is present, the method may include sending a notification to a computing device in response to detecting the gas leak.

Various refinements of the features noted above may exist in relation to various aspects of the present disclosure. Further features may also be incorporated these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed above, gases may be part of various types of energy systems. However, gas emissions caused by leaks in the energy systems may negatively affect the efficiency of the systems and could release greenhouse gases into the environment. Current environmental regulations may involve periodically performing leak detection and repair (LDAR) surveys at oil and gas facilities. LDAR surveys may use EPA (Environmental Protection Agency) Method-21 or manually-operated infrared (IR) optical gas imaging (OGI) technologies to detect leaks. Despite its widespread use, however, OGI performance is affected by environmental conditions, operator experience, survey practices, leak size distributions and gas composition. Further, IR OGI technology may generate speculative results because the IR cameras cannot provide real-time feedback of leak detection results without operators' judgement. Additionally, IR OGI technology may provide inconsistent quality of surveys that vary between different OGI operators, may be labor and cost intensive for manual OGI surveys, and may be infeasible for continuous monitoring with IR cameras.

With this in mind, it should be noted that detecting a gas leak typically requires operators to periodically check equipment for leaks via on-site leak detection surveys. A common approach to conducting a leak detection survey is to conduct an optical gas imaging (OGI)-based survey. Leaks detected in this manner may be performed by a crew of 2 to 3 operators or by means of drones or planes. In this way, OGI-based surveys may be cost-prohibitive and inefficient, which may delay identification of a leak and, thereby, prolong the occurrence of a leak before it is repaired. As such, efficiently identifying leaks via optical gas imaging can be difficult. Accordingly, it is desirable to have a leak detection system that improves the temporal and economic efficiency for detecting gas leaks of hydrocarbon production equipment.

To address these challenges and detect gas leaks more efficiently, the present disclosure describes a leak detection system that employs computer vision modeling techniques based on convolutional neural networks (CNNs). Such models may be trained to examine IR images to determine whether a gas leak is present. As such, the leak detection system may allow for automatic leak detection, reduced labor and equipment costs, and may help remove the inconsistency and uncertainty associated with operator experience. In some embodiments, the leak detection system may train a leak detection model using high resolution IR video (e.g., 1920×1080 pixels, 60 Hz frame rate) that may be segmented into multiple frames. Each frame may be characterized according to certain model parameters that can be applied to the leak detection model in the form of a multi-variable function or equation that represents expected visual indicators associated with the leaking gas and the movement of the visual indicators within the respective environment as presented in the frames of the high-resolution IR video. Over time or multiple observations, the leak detection system may tune or adjust the multi-variable function or model to more accurately recognize the expected appearance and movement of the gas leak. In other words, the leak detection system may employ a training process on the frames of image data by extracting features of each frame of the high-resolution video that includes one or more known gas leaks. Each frame may then be segmented to isolate and extract the features that may be correlated to the known leak, so as to associate the visual characteristics of the known leak (input) with a known leak rate (output). For example, the features (e.g., leak rate, shape) of a gas cloud itself may be extracted in each frame to track the movement of the gas cloud, the shape of the gas cloud, the volume of the gas cloud, and the like.

After the features of the high-resolution images are extracted, the leak detection system may generate a leak detection model that characterizes the relationships or correlations between the extracted features and their effects or influences to the model. That is, the leak detection model may represent a connection between each feature and corresponding output result, provide a weight for each connection that corresponds to a strength of the correlation, and the like. In this way, the leak detection model may be a multi-variable function or equation that relates image inputs with calibrated outputs using weights or model parameters. As a result, the model parameters are not resolution specific and may be tuned or calibrated to further minimize error and to more accurately recognize a gas leak in images of a variety of resolutions.

Indeed, after the leak detection model is trained on the high-resolution IR video dataset, the leak detection model may be applied on an IR sensor or image data that has lower resolution quality as compared to the IR image data that was used to generate the leak detection model. With this in mind, after the leak detection model is generated and the model parameters are extracted, the leak detection system may apply the leak detection model to new image data via a process called transfer learning that may involve associating the visual characteristics of a gas leak as detected via the collected IR image data and features present in the leak detection model generated using the high-resolution images. That is, the leak detection system may apply the leak detection model to other images of varying resolutions to accurately recognize a gas leak. Indeed, the leak detection system may employ the leak detection model to identify gas leaks represented in the new images based on the features provided in the leak detection model. Although the new image may have a lower pixel rate or frame rate, the new image should be of a similar class or context and thus the extracted features represented in the leak detection model may be visible in the new images even at lower resolutions. As such, the leak detection system may accurately recognize and detect a gas leak. In the present disclosure, for example, the leak detection model may be trained to recognize and detect a gas leak in a second image based on features the leak detection model gathered from a known gas leak in a first image. In this way, the model may be trained using high-resolution IR camera image data and then applied to another set of image data of a lower resolution. As such, this process of transfer learning enables detection of a gas leak using low-cost devices with the accuracy and efficiency of using a high-resolution IR camera.

By incorporating the systems and techniques described herein, gas leaks may be accurately and efficiently detected using more cost-effective devices (e.g., cameras), thereby enabling continuous monitoring via multiple imaging devices. In some embodiments, the leak detection system may send a notification to other devices related to detected leaks, such that other operators may schedule subsequent repairs. As such, the volume of the detected methane leak may be constantly estimated and updated in real-time based on visual features detected from the IR image data and the analysis performed using the leak detection model without the relying on operator judgement. Additional details with regard to detecting gas leaks via machine learning will be discussed below with reference to FIGS. 1-4.

Figure 1:
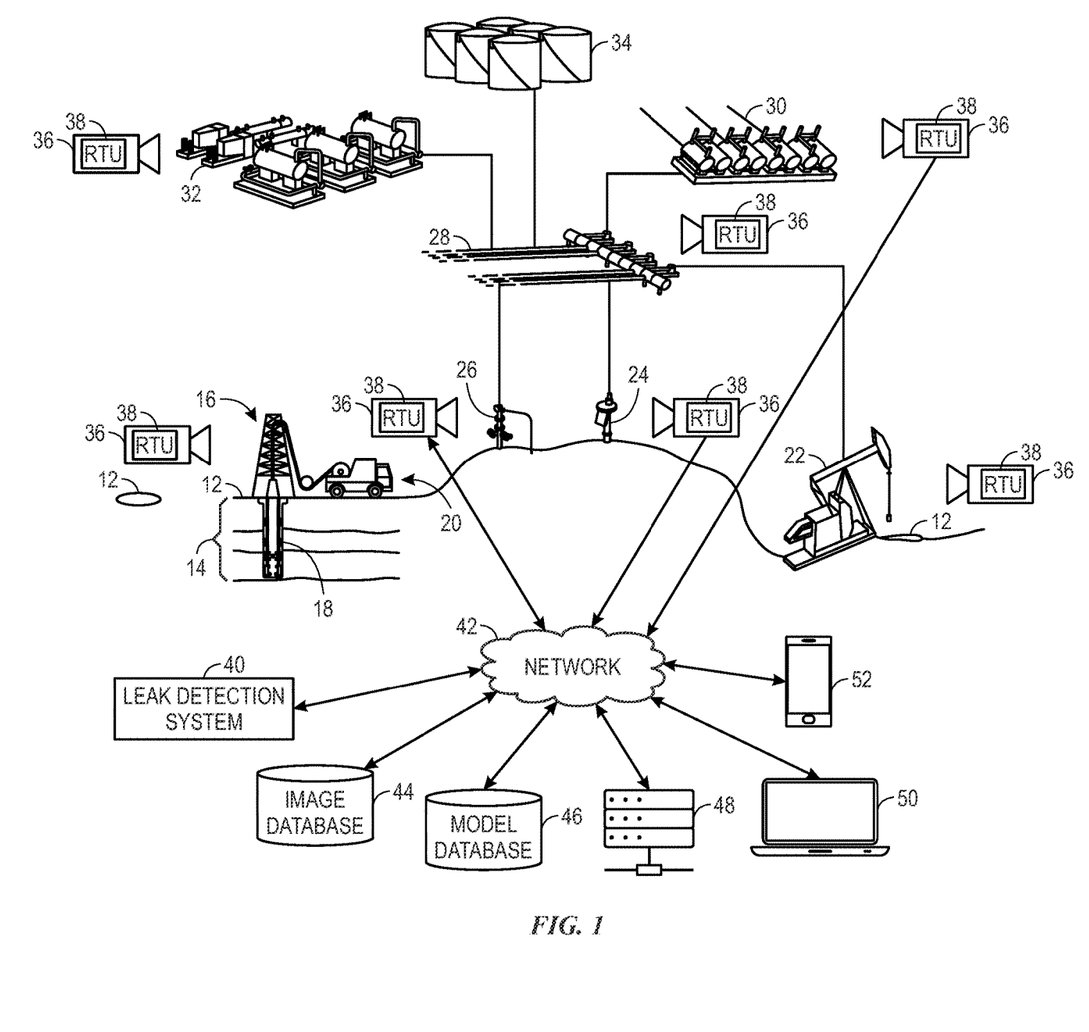
FIG. 1 illustrates a schematic diagram of a leak detection system implemented at a hydrocarbon site that may produce and process hydrocarbons, according to one or more embodiments of this disclosure.

By way of introduction, FIG. 1 illustrates a schematic diagram of an example hydrocarbon site 10 where hydrocarbon products, such as crude oil and natural gas, may be extracted, processed, and stored. In accordance with the present embodiments, the hydrocarbon site 10 may include a number of components or facilities that correspond to wells, processing facilities, collection components, distribution networks, and the like.

The hydrocarbon site 10 may include a number of wells 12 disposed within a geological formation 14. The wells 12 may include drilling platform 16 that may have performed a drilling operation to drill out a wellbore 18. Additionally, as used herein, wells 12 may generally refer to physical components such as the drilling platform 16 and wellbore 18 and/or the general area of the reservoir in which extraction is desired (e.g., a reservoir well section). The drilling operations may include drilling the wellbore 18, injecting drilling fluids into the wellbore 18, performing casing operations within the wellbore 18, and the like. In addition to including the drilling platform 16, the hydrocarbon site 10 may include surface equipment 20 that may carry out certain operations, such as cement installation operation, well logging operations to detect conditions of the wellbore 18, and the like. As such, the surface equipment 20 may include equipment that store cement slurries, drilling fluids, displacement fluids, spacer fluids, chemical wash fluids, and the like. The surface equipment 20 may include piping and other materials used to transport the various fluids described above into the wellbore 18. The surface equipment 20 may also include pumps and other equipment (e.g., batch mixers, centrifugal pumps, liquid additive metering systems, tanks, etc.) that may fill in the interior of a casing string with the fluids discussed above.

In addition to the equipment used for drilling operations, the hydrocarbon site 10 may include a number of well devices that may control the flow of hydrocarbons being extracted from the wells 12. For instance, the well devices in the hydrocarbon site 10 may include pumpjacks 22, submersible pumps 24, well trees 26, and the like. The pumpjacks 22 may mechanically lift hydrocarbons (e.g., oil) out of the well 12 when a bottom hole pressure of the well 12 is not sufficient to extract the hydrocarbons to the surface. The submersible pump 24 may be an assembly that may be submerged in a hydrocarbon liquid that may be pumped. Further, the hermetically sealed motor may push hydrocarbons from underground areas or the reservoir to the surface. The well trees 26 may be an assembly of valves, spools, and fittings used for natural flowing wells. As such, the well trees 26 may be used for an oil well, gas well, water injection well, water disposal well, gas injection well, condensate well, and the like.

After the hydrocarbons are extracted from the surface via the well devices, the extracted hydrocarbons may be distributed to another site via a network of pipelines 28. That is, the well devices of the hydrocarbon site 10 may be connected together via a network of pipelines 28. In addition to the well devices described above, the network of pipelines 28 may be connected to other collecting or gathering components, such as wellhead distribution manifolds 30, separators 32, storage tanks 34, and the like.

In some embodiments, the pumpjacks 22, the submersible pumps 24, well trees 26, wellhead distribution manifolds 30, separators 32, and storage tanks 34 may be connected together via the network of pipelines 28, as depicted in FIG. 1. Alternatively, in another embodiment, the hydrocarbon site 10 may consist of the pumpjacks 22, the submersible pumps 24, well trees 26, wellhead distribution manifolds 30, separators 32, or the storage tanks 34, either alone or in any combination thereof. As such, although the hydrocarbon site 10 is described above with certain components, it should be understood that the hydrocarbon site 10 may include additional, fewer, or different components. For example, although discussed above in relation to a hydrocarbon site 10 on land, present embodiments may also include analysis of off-shore hydrocarbon sites 10 and the components thereof. That is, the embodiments described herein are directed to demonstrating any suitable hydrocarbon site that may include various types of components that is related to the production and distribution of hydrocarbons or byproducts of the hydrocarbons.

With this in mind, various locations or areas of the hydrocarbon site 10 or other suitable location in which gases may be transported may include one or more infrared cameras 36 or other infrared imaging device. Each infrared camera 36 may be equipped with or coupled to a remote terminal unit (RTU) 38 or processing device that may be used for continuous monitoring of the respective devices. Each RTU 38 may be receive image data acquired by the infrared camera 36 at some frequency or number of frames per second. As discussed more below, the captured image data may be viewed in real-time via a display or via another computer or mobile device via a web browser or the like.

It should be noted that the components depicted in FIG. 1 are provided as an example context in which a leak detection system 40 described herein may be implemented. As such, the embodiments of this disclosure should not be limited to the components listed in FIG. 1. Moreover, additional components relating to on- or off-shore hydrocarbon production, processing, or distribution system may be monitored in accordance to the leak detection system 40 described herein.

In some embodiments, the leak detection system 40 may communicate with the infrared cameras 36, the RTUs 38, or both via a network 42 in connection with any suitable number of additional devices or components. That is, the leak detection system 40 may receive data from the various devices to apply certain predictive algorithms and modeling techniques using leak detection model specifications and parameters as detailed further below. The communication between such additional devices or components and the leak detection system 40 may involve communications over any suitable network 42 including wired and wireless networks, such as Wi-Fi, LTE, 5G, and the like.

Implementation of the leak detection system 40 may employ various additional components, such as a computing device, cloud-computing device, or the like, as well as one or more databases, to perform various analysis operations. As shown in FIG. 1, such components may include an image database 44, a model database 46, a server 48, a computing device 50, a mobile device 52, one or more infrared cameras 36, or any combination thereof. Such components may communicate with each other and with the leak detection system 40 via connection to the network 42.

For example, the server 48 may communicate with the leak detection system 40 via the network 42. In some embodiments, the leak detection system 40 may employ the server 48 to assist the leak detection system 40 in applying modeling techniques and algorithms to received infrared image data from the one or more infrared cameras 36 as will be detailed below. The server 48 may include a collection of computing resources that may perform computing analysis and processes across the collection of resources. As such, the server 48 may include a collection of computing devices, a cloud-computing system, or any suitable computing resource that may include more processing capabilities than the leak detection system 40.

The leak detection system 40 may communicate or access the image database 44 and the model database 46, as shown in FIG. 1. The image database 44 may receive, send, and store infrared image data acquired by the various infrared cameras 36 or provided to the image database 44. The image database 44 may thus include a collection of infrared images and videos that detail gas escaping from various types of equipment (e.g., piping, manifold, storage tanks) over some period of time. The model database 46 may store various leak detection models that represent various gas leaks from the various types of equipment. The leak detection model may include certain model parameters that may be associated with different types of gases and/or environmental contexts.

In some embodiments, the computing device 50 may include a personal computer (PC), a laptop computer, or other suitable computing device. In the same manner, the mobile computing device 52 may include a smartphone, a tablet device, or any other suitable compact computing device. It should be noted that the embodiments described herein may be performed in any suitable computing device such as the server 48, the computing device 50, the mobile computing device 52, or the like. However, certain devices may provide advantages of use over others due to the respective properties of the respective computing device.

Figure 2:
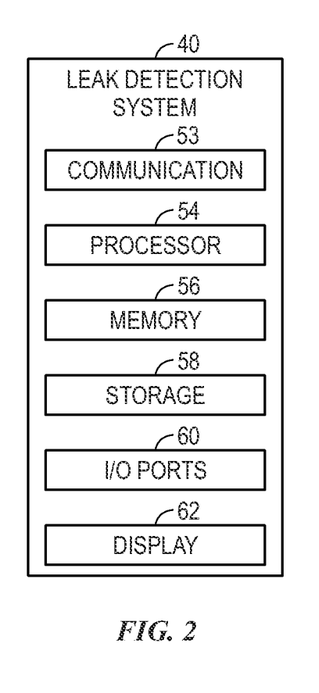
FIG. 2 various components that may be part of a leak detection system for determining the occurrence of a gas leak that may be part of the hydrocarbon site of FIG. 1, according to one or more embodiments of this disclosure.

Referring now to FIG. 2, the leak detection system 40 may include any suitable computing device, cloud-computing device, or the like and may include various components to perform various analysis operations related to performing the embodiments described herein. By way of example, the leak detection system 40 may include a communication component 53, a processor 54, a memory 56, a storage component 58, input/output (I/O) ports 60, a display 62, and the like. The communication component 53 may be a wireless or wired communication component that may facilitate communication between different monitoring systems, gateway communication devices, various control systems, and the like. The processor 54 may be any type of computer processor (e.g., multi-core) or microprocessor capable of executing computer-executable code. The memory 56 and the storage component 58 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 54 to perform the presently disclosed techniques. The memory 56 and the storage component 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to the infrared cameras 36 or other infrared sensors, thermal sensors, temperature sensors, and the like. As such, the leak detection system 40 may receive infrared data associated with the one or more gas leaks via the I/O ports 60. The I/O ports 60 may also serve as an interface to enable the leak detection system 40 to connect and communicate with surface instrumentation, servers, computing devices, and the like. Connection between the I/O ports 60 and surface instrumentation, servers, and infrared or other thermal sensor equipment may be a wireless or wired communication.

The display 62 may include any type of electronic display such as a liquid crystal display, a light-emitting-diode display, and the like. As such, data acquired via the I/O ports and/or data analyzed by the processor 54 may be presented on the display 62, such that the leak detection system 40 may present image data of a detected gas leak. In certain embodiments, the display 62 may be a touch screen display or any other type of display capable of receiving inputs from an operator. Although the leak detection system 40 is described as including the components presented in FIG. 2, the leak detection system 40 should not be limited to including the components listed in FIG. 2. Indeed, the leak detection system 40 may include additional or fewer components than described above. Further, the components of the leak detection system 40 may also be included in the server 48, the computing device 50, the mobile computing device 52, and the like.

With the foregoing in mind, the leak detection system 40 may implement a method to detect a gas leak via computer vision modeling techniques based on CNNs. For instance, the leak detection system 40 may receive a first set of image data of a first resolution and extract gas leak features from the first set of image data. A leak detection model may be generated based on the extracted features. The leak detection system 40 may then receive a second set of image data containing an undetected gas leak of a second resolution. The leak detection system 40 may predict the gas leak properties of the undetected gas leak based on the second set of image data and the leak detection model. Model parameters may be calibrated based on discrepancies between the predicted gas leak and the actual gas leak to increase model accuracy. The leak detection system 40 may then update the leak detection model based on the calibrated model parameters and store the updated leak detection model.

Keeping this in mind, the present embodiments described herein may include systems and methods for identifying and tagging detected gas leaks at a hydrocarbon site 10 based on infrared image data. By way of operation, the leak detection system 40 may receive the infrared image data and identify a set of gas leak characteristics defined by a gas leak model based on calibrated model parameters according to a process that will be described in greater detail below with reference to FIGS. 3 and 4.

Figure 3:
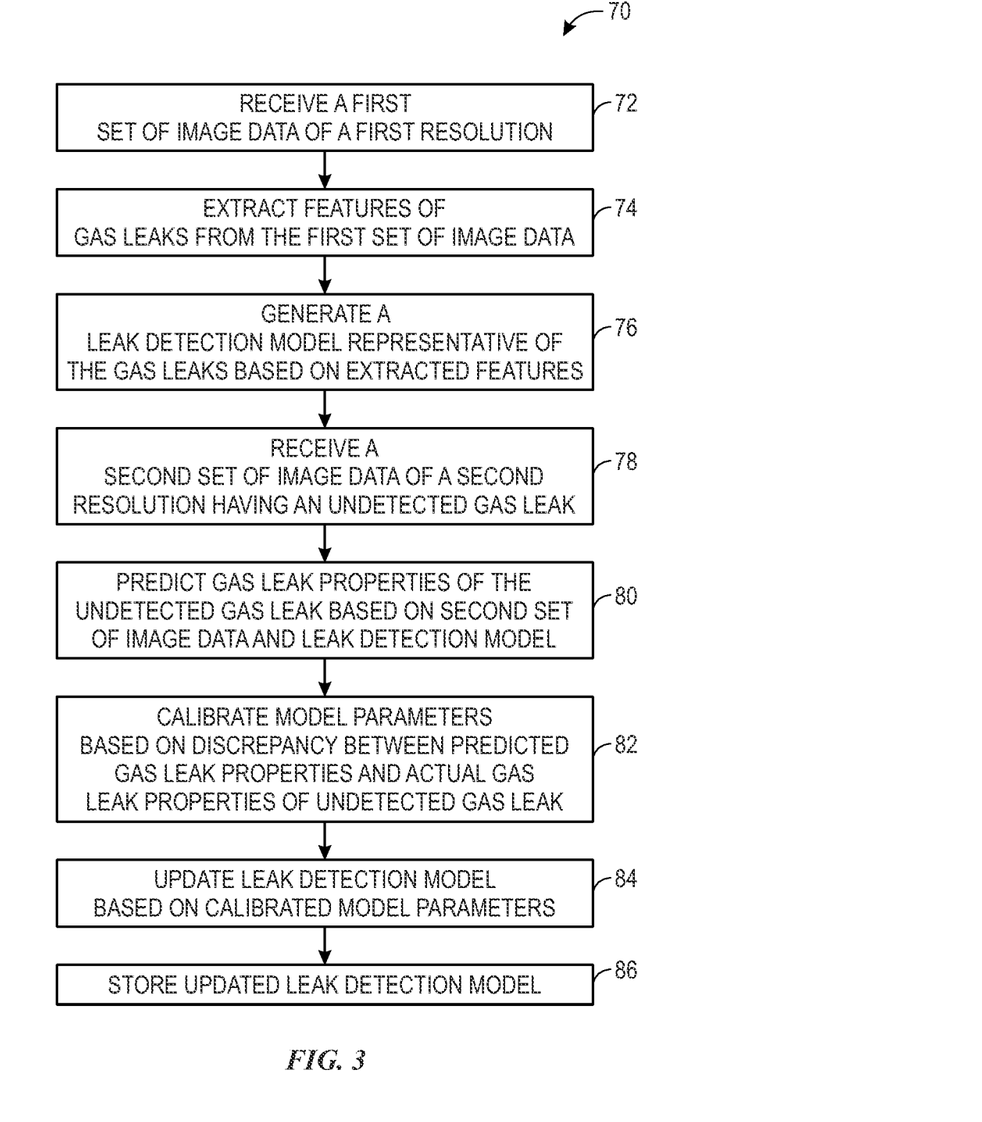
FIG. 3 illustrates a flow diagram of an example method for training a gas leak detection model, in accordance with an aspect of the present disclosure.

Referring first to FIG. 3, FIG. 3 illustrates a flow chart of a method 70 for generating a leak detection model for identifying gas leaks in certain equipment. Although the following description of the method 70 will be described as being performed by the leak detection system 40, it should be noted that any suitable computing device may perform the method 70. Additionally, although the method 70 is described in a particular order, it should be understood that the method 70 may be performed in any suitable order.

As shown in FIG. 3, at block 72, the leak detection system 40 may receive a first set of image data at a first resolution. In one embodiment, the image data may be sourced from video data recorded via high-resolution infrared cameras (e.g., 1920×1080 pixels, 60 Hz frame rate, and such). The high-resolution video data may be split into individual frames to generate the first set of image data. Alternatively, the image data may be received already in the form of individual frames, such as from still-photos captured with a high-resolution infrared camera. Although the first set of image data is described as being received via infrared cameras, it should be noted that other suitable cameras capable of detecting heat, pressure, or other properties associated with a gas leak may be used in accordance with the embodiments described herein.

In any case, the first set of image data may be collected from image sensors and may include images of detected gas leaks. That is, the collected image data may serve as training data for the embodiments described below to generate a leak detection model or the like. As such, the first set of image data may be collected from a variety of environments, with respect to a variety of types of equipment, and the like. The image data may include metadata or other data characteristics that may provide time information, location information, device information, user information, and other information that may be related to the objects or environment in which the image data was acquired.

At block 74, the leak detection system 40 may extract features of gas leaks from the first set of image data. To accomplish this, in some embodiments, the leak detection system 40 may detect a gas cloud in each individual frame of the image data. Indeed, to enhance the detection or viewability of the features that may be indicative of the gas cloud, the leak detection system 40 may alter the image data using techniques such as image augmentation, horizontal flipping, adding noise, cropping, and the like.

In some embodiments, the individual frame with the detected gas cloud may be segmented. That is, the individual frame with the detected gas cloud may be divided into multiple image segments or image regions, consisting of a set of pixels. The goal of segmentation may include simplifying and/or changing the representation of an image into something that is more meaningful and easier to analyze. Image segmentation may be used to locate objects and boundaries (lines, curves, etc.) in images. More precisely, image segmentation may include the process of assigning a label to one or more pixels in an image, such that pixels with the same label share certain characteristics. After performing the image segmentation, the leak detection system 40 may collect a set of segments that cover the entire image, a set of contours extracted from the image, and the like. Each of the pixels in a region of the image that is similar with respect to some characteristic or property, such as color, intensity, or texture may be categorized as part of a segment of the image. For example, in the present disclosure, each segmented region of an individual frame containing a gas cloud may share some characteristic or property that may be classified as part of a gas leak.

In some embodiments, the process of segmentation and extraction may be achieved using a customized MaskRCNN (mask regional convolutional neural network) or other suitable interpolation/convolution technique. By way of example, MaskRCNN is a recognized deep learning architecture, which may assist in object detection, segmentation, and classification of image data. With this in mind, the leak detection system 40 may apply a MaskRCNN to the first set of image data received at block 72 may by having a region proposal network (RPN) propose one or more candidate object bounding boxes that may define or characterize bounds of certain properties related to the gas leak. The MaskRCNN methodology may then employ a binary mask classifier to generate a mask and bounding box for each identified class of the proposed candidate object bounding box. That is, the classifier may designate a characteristic or property that each portion of the image data that are part of the same candidate object bounding box may share.

Keeping this in mind, the MaskRCNN methodology implemented by the leak detection system 40 may involve a backbone stage that may include passing the image through a backbone network to convert the received image to a feature map of any detected shape within the image data. This feature map becomes the input for the following stages. For example, in some embodiments, the MaskRCNN may employ a ResNet50 convolutional neural network with a feature pyramid network (FPN) backbone to classify the portions of the received image into object categories or classifications associated with the gas leak.

As mentioned above, the MaskRCNN may include the RPN to propose candidate object bounding boxes. By way of example, the RPN may involve using a lightweight neural network (e.g., subset of conventional continuous-weight networks (CWN)) that may have weights of approximately 1.1 bits per weight of storage and their forward passes do not involve floating-point math. The lightweight neural network may scan the image in a sliding-window fashion and find areas that contain objects or properties associated with the gas leak. The regions that the RPN scans over may be referred to as anchors, which may correspond to boxes distributed over the image area. The RPN may generate two outputs for each anchor: an anchor class (e.g., foreground or background) and a bounding box refinement (e.g., an anchor centered over the object to fit it).

The MaskRCNN may the involve a regions of interest (ROI) classifier stage that may involve evaluating the anchors proposed by the RPN. Similar to the RPN stage described above, the ROI classifier stage may involve generating two outputs for each anchor or region of interest (ROI): the class of the object in the ROI (e.g., gas, no gas) and a bounding box refinement. By employing the ROI classifier stage, the leak detection system 40 may further refine the location and size of the bounding box to encapsulate the object or feature to be extracted.

The MaskRCNN may then include a segmentation masking stage, which may correspond to a mask branch or a convolutional network that takes the positive regions selected by the ROI classifier and generates masks for them: one mask per detected object. In this way, features of a gas leak may be extracted from the first set of image data, which may be applied to generate the leak detection model.

At block 76, the leak detection system 40 may generate a leak detection model representative of the gas leaks based on the extracted features described above with respect to block 74. The leak detection model may be a multi-variable function or equation that relates the image inputs with calibrated outputs using weights or model parameters, as determined using the techniques described above. In this way, the leak detection model characterizes the relationships or correlations between the extracted features of the gas leak and their effects or influences to the model. That is, the leak detection model may represent a connection between each feature and corresponding output result, provide a weight for each connection that corresponds to a strength of the correlation, and the like. As a result, the model parameters themselves may not be resolution specific and, instead, may be tuned or calibrated to further minimize error and to more accurately recognize a gas leak in images of a variety of resolutions, as described in more detail below.

In one embodiment, the leak detection model may be trained using a vision library, such as Detectron 2 (e.g., a PyTorch-based modular object detection/segmentation library). The vision library may provide detection and segmentation algorithms, including the MaskRCNN model, as well as a variety of tools for augmentation, visualization, and analysis.

At block 78, the leak detection system 40 may receive a second set of image data of a second resolution having an undetected gas leak. That is, the second set of image data may be provided as a test image that includes a gas leak to determine whether the leak detection model may be used to accurately determine whether the leak detection system 40 may detect gas leaks. In some embodiments, the image data may be sourced from video data recorded via an infrared camera with lower-resolution acquisition properties relative to the resolution of the first set of image data. The lower-resolution video data may be split into individual frames to provide the second set of lower-resolution image data. Alternatively, the second set of lower-resolution image data may be received already formatted as single frames, such as a photograph taken with a relatively low-resolution infrared camera. Unlike the first set of image data, in which the properties of a known gas leak were detected and extracted, the second set of image data may be of a similar class or context but may include undetected gas leak properties that may be predicted by the leak detection model. Thus, although the new image may have a lower pixel rate or frame rate, the second set of image data may be of a similar class or context, and, thus, the extracted gas-leak features classified by the leak detection model may be recognized by the leak detection system 40 in the second set of image data, even at lower resolutions.

At block 80, the leak detection system 40 may predict whether gas leak properties of a gas leak are present based on the second set of image data and the leak detection model. In some embodiments, the leak detection system 40 may evaluate model performance by predicting the properties of the undetected gas leak using a reported intersection over union (IoU) evaluation metric for detecting objects. The IoU evaluation metric may compute intersection over the union of two bounding boxes, such as the bounding box for the ground truth and the predicted bounding box. An IoU of 1 implies that predicted and the ground-truth bounding boxes perfectly overlap. The primary metric for the segmentation task is the mask mean average precision (mAP) score using IoU thresholds ranging from 0.5 to 0.95 (in 0.05 increments)-mAP(0.5:0.95). In general mAP values higher than 50% may be considered as being suitable for object detection. In this way, after the leak detection model is generated and the model parameters are extracted, the leak detection system 40 may apply the leak detection model to the second set of image data via a process called transfer learning. Transfer learning may involve associating the visual characteristics of a gas leak as detected via the first set of image data depicting features segmented and classified by the leak detection model. As such, the leak detection system 40 may apply the generated leak detection model to other images of varying resolutions to accurately recognize a gas leak.

At block 82, the leak detection system 40 may calibrate model parameters of the leak detection model based on the discrepancy between predicted gas leak properties and actual gas leak properties of undetected gas leak. After the model predicts the properties of the undetected gas leak, a loss may be determined that is representative of the true gas leak properties and the predicted gas leak properties. In this way, introducing the second set of image data may improve the accuracy of the model by calibrating the model as part of a training, re-training, or transfer learning operation. For example, the accuracy of the gas leak detection model may be improved with the following equation: Loss=LCLS+Lbbox+Lmask, where Loss corresponds to overall loss, LCLS corresponds to class loss (i.e. if prediction gas/no gas is correct), Lbbox corresponds to bounding box loss (i.e. mismatch between predicted and true bounding boxes), and Lmask corresponds to mask loss (i.e. mismatch between predicted and true masks). In this way, after the model is trained, validation loss (i.e. the metric used to assess the performance of a deep learning model on the validation set) may be assessed to calibrate model performance and avoid model overfitting.

At block 84, the leak detection system 40 may update the leak detection model based on the calibrated model parameters. That is, after the leak detection model is trained on the high-resolution IR image data, the leak detection model may be applied to the second set of image data with lower resolution quality as described above to calibrate the generated leak detection model, thereby updating the leak detection model with improved accuracy of gas leak property detection for lower resolution images as compared to the training data used at block 72. Indeed, the leak detection system 40 may employ the leak detection model to identify gas leaks represented in the new images based on the features provided in the leak detection model. At block 86, the leak detection system 40 may store the updated leak detection model in the model database 46 or other suitable storage component.

Figure 4:
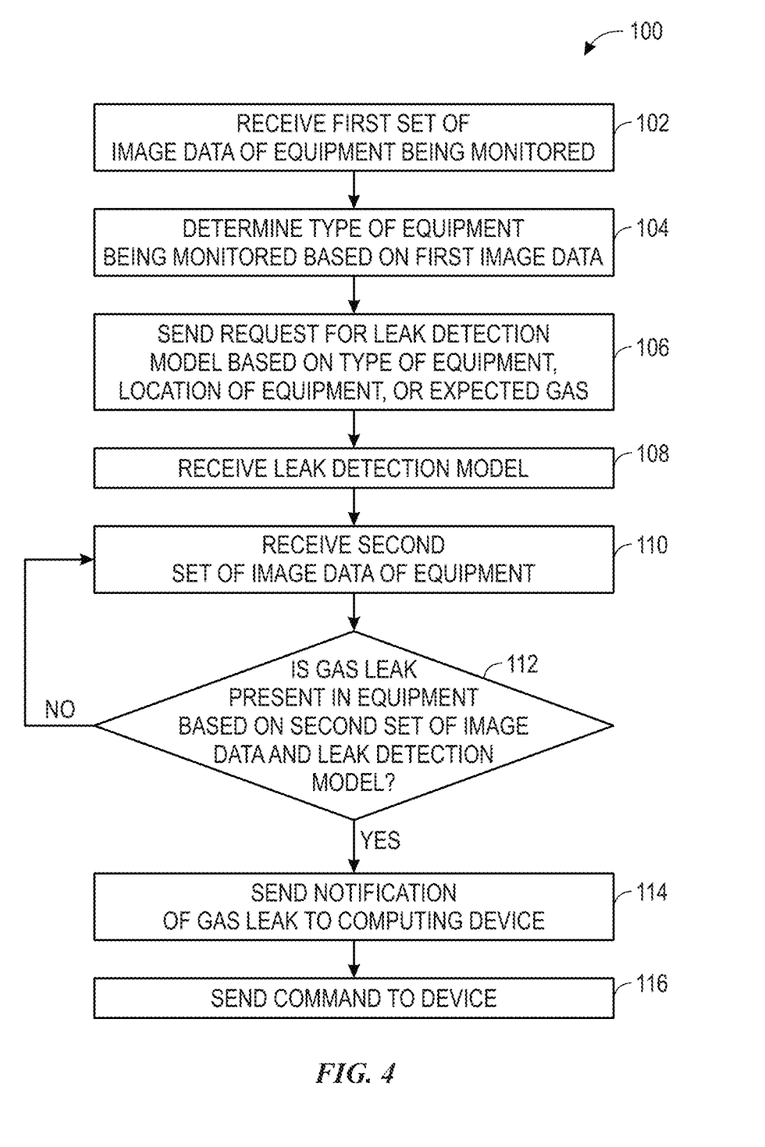
FIG. 4 illustrates a flow diagram of an example method for detecting a gas leak via a leak detection system executed using an infrared camera equipped with a remote terminal unit, in accordance with an aspect of the present disclosure.

Referring now to FIG. 4, FIG. 4 a flow chart of a method 100 for detecting a gas leak via a leak detection system 40 executed using infrared cameras 36 equipped with or coupled to a remote terminal unit, in accordance with an aspect of the present disclosure. Although the following description of the method 100 will be described as being performed by the leak detection system 40, it should be noted that any suitable computing device may perform the method 100. Additionally, although the method 100 is described in a particular order, it should be understood that the method 100 may be performed in any suitable order.

As shown in FIG. 4, at block 102, the leak detection system 40 may receive a first set of image data of equipment being monitored (e.g., at the hydrocarbon site 10). The image data may be received from a collection of infrared still-photos, videos, or other suitable image data stored in the image database 44. In some embodiments, the image data may be sourced from real-time video data recorded via the infrared camera 36 that is equipped with or coupled to a remote terminal unit (RTU) 38 or other suitable processing device used for continuous monitoring of the equipment. Image data in the form of video data, whether from the image database 44 or gathered in real-time, may be split into individual frames to generate the first set of image data. Alternatively, the image data may be received already in the form of individual frames, such as from still-photos captured via the infrared cameras 36 or from the image database 44.

The image data may be acquired at some frequency or number of frames per second. Further, the image data may feature gas escaping from various types of equipment (e.g., piping, manifold, storage tanks) over some period of time. As such, the first set of image data may be collected from a variety of environments, with respect to a variety of types of equipment, and the like. Although the first set of image data is described as being received via infrared cameras, it should be noted that other suitable cameras capable of detecting heat, pressure, or other properties associated with a gas leak may be used in accordance with the embodiments described herein. Indeed, as mentioned above, the image data may include metadata or other data characteristics that may provide time information, location information, device information, user information, and other information that may be related to the objects or environment in which the image data was acquired.

At block 104, the leak detection system 40 may determine the type of equipment being monitored based on the first image data. In some embodiments, the leak detection system 40 may prompt a user to input the type of gas being monitored via a visualization, a graphical user interface, a notification transmitted to a computing device associated with the user, or the like.

In addition, the leak detection system 40 may determine the type of gas being monitored based on data present within the image data. That is, the image data may include objects that identify the devices, equipment, or facility in which the image data is acquired. The leak detection system 40 may use optical character recognition or other suitable data analysis techniques to interpret the text depicted on the objects to determine the type of equipment present. The leak detection system 40 may then cross reference the collected information with a database to determine a gas that may be present in the equipment. In other embodiments, the leak detection system 40 may receive data from other data sources within the environment or from the devices themselves, such that the received data may include identifying information that detail the type of equipment, a project identifier, or other information in which the leak detection system 40 may use to determine the type of equipment present in the respective facility.

As described above, the image data may be collected in a variety of environments and of a variety of equipment. As previously described, the model database 46 may store various leak detection models that represent various gas leaks from the various types of equipment. Different leak detection models may include different model parameters depending on the type of gases, environmental contexts, or equipment being monitored. That is, different types of equipment, environments, and gases may result in different gas cloud properties and, therefore, may involve different leak detection models to accurately detect a gas cloud. As such, the leak detection system 40 may more accurately detect a gas cloud in a certain context if the type of equipment being monitored is identified.

At block 106, the leak detection system 40 may send a request for the appropriate leak detection model based on the determined type of equipment, the location of the equipment, and/or the type of gas being monitored. That is, the leak detection system 40 may query a database or other suitable storage component for the leak detection model that matches the type of equipment determined at block 104. In some embodiments, the leak detection system 40 may retrieve a leak detection model that best matches the type of equipment. That is, if the type of equipment is not directly associated with a particular leak detection model, the leak detection system 40 may find a leak detection model that corresponds to a property of the type of equipment, the expected gas present in the equipment, or other suitable property.

At block 108, the leak detection system 40 may receive the leak detection model corresponding to the identified type of equipment, environment, and gas being monitored. The leak detection system 40 may receive the model from the model database 46 or other suitable storage component. In some embodiments, the leak detection system 40 may send a request to the server 48 or other cloud computing system, which may provide a suitable leak detection model for the leak detection system 40 to use.

At block 110, the leak detection system 40 may receive a second set of image data of the equipment being monitored. The second set of image data may be acquired at some frequency or number of frames per second that differ from the first set of image data. The second set of image data may be gathered in real-time and may be of an undetected gas leak. That is, the second set of image data may be provided to determine whether a leak is present at the equipment being monitored at the hydrocarbon site 10. In some embodiments, the second set of image data may be the same as the first set of image data received at block 102. In either case, the second set of image data may be sourced from real-time video data recorded via the infrared camera 36 equipped with or coupled to a remote terminal unit (RTU) 38 or processing device that may be used for continuous monitoring of the equipment being monitored. Image data in the form of video data may be analyzed with respect to their individual frames.

At block 112, the leak detection system 40 may determine whether a gas leak is present in the equipment based on the second set of image data and the leak detection model. Indeed, after the leak detection model corresponding to the identified equipment, environment, and/or type of gas is received, the leak detection model may be applied to the second set of image data. That is, the leak detection system 40 may employ the leak detection model to identify gas leaks present in the second set of images based on the features trained and calibrated in the leak detection model. The second set of image data may be of the same or similar context and equipment represented in the leak detection model. As such, the leak detection model used to detect the gas leak may analyze the second set of image data for expected gas cloud properties of a gas leak of the same type of gas from the same equipment or in the same or similar environment. As such, the leak detection system 40 may accurately recognize and detect whether a gas cloud is leaking from the equipment. In the present disclosure, for example, the leak detection model may be trained to recognize and detect a gas leak in a second image based on the determined type of equipment and type of gas being monitored from the first set of image data.

If, at block 112, the leak detection system 40 determines that a gas leak is not present in the second set of image data, the leak detection system 40 may return to block 110 and continue monitoring the equipment via the infrared camera 36, thereby enabling continuous monitoring via multiple imaging devices. Alternatively, at block 112, if the leak detection system 40 detects a gas leak, then the leak detection system 40 may proceed to block 114 and send a notification of the gas leak to another device, such as a computing device 50, the server 48, a mobile device 52, or any combination thereof the network 42. For example, in some embodiments, the leak detection system 40 may send a notification to another device such that an operator may schedule subsequent repairs. In some embodiments, the computing device 50 may include a personal computer (PC), a laptop computer, or other suitable computing device. In the same manner, the mobile computing device 52 may include a smartphone, a tablet device, or any other suitable compact computing device.

Since the gas leak may be detrimental to operations of the equipment or the environment therein, the notification sent to the respective computing device may cause the computing device to execute an application, annunciate an alarm (e.g., visual, audible, haptic), or perform some other operation regardless of the operating state of the respective computing device. That is, for example, the notification may cause the respective computing device to exit a low power mode and present a visualization, generate an alarm (e.g., audible, haptic), or perform some other operation to enable the respective use to become aware of the detected leak. In this way, the embodiments described herein may allow the user to efficiently track the integrity of the respective equipment to ensure that the respective environment is suitable for performing the related tasks.

At block 116, the leak detection system 40 may send a command to the equipment identified in the first image data or other safety equipment (e.g., switchgear, protection equipment, manifold) to prevent the gas leak from continuing to spread. That is, the leak detection system 40 may identify a device (e.g., actuator of valve) that may be located upstream from the location of the gas leak and send a command to the device to cause the device to close or prevent gas from being supplied to the location of the leak. In addition, the leak detection system 40 may send commands to other devices to stop operations, change speed, modify operating parameters, or any other control protocol to ensure that the environment is safe. Once the gas leak has stopped and/or the equipment returns to operation, the leak detection system 40 may resume monitoring the equipment.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   receiving, via one or more processors, a first set of image data representative of equipment configured to distribute a gas;
   extracting, via the one or more processors, one or more features from the first set of image data, wherein the one or more features are representative of one or more gas leaks associated with the equipment, wherein the one or more features are identified by applying a mask regional convolutional neural network to the first set of image data to determine one or more candidate object bounding boxes associated with the one or more gas leaks;
   generating, via the one or more processors, a leak detection model based on the one or more features, wherein the leak detection model correlates the extracted features of the one or more gas leaks with a corresponding calibrated output of the leak detection model, wherein the leak detection model provides a weight for each correlation corresponding to a strength of the correlation;
   receiving a second set of image data;
   determining, via the one or more processors, a type of the equipment depicted in the second set of image data;
   retrieving, via the one or more processors, the leak detection model corresponding to the type of the equipment depicted in the second set of image data;
   training, via the one or more processors, the leak detection model to accurately detect the one or more gas leaks based on the second set of image data provided to the leak detection model, wherein the second set of image data is associated with a test image;
   in response to determining, via the one or more processors, that the trained leak detection model accurately detects leaks based on the second set of image data;
   determining, via the one or more processors, that a gas leak is present on the equipment based on the second set of image data and the trained leak detection model;
   sending, via the one or more processors, a notification to a computing device in response to detecting the one or more gas leaks; and
   sending, via the one or more processors, a command to a device to cause the device to close to prevent gas from being supplied to the one or more gas leaks.

2. The method of claim 1, comprising determining one or more feature maps representative of one or more shapes of the one or more gas leaks.

3. The method of claim 1, wherein the leak detection model is generated by:
   classifying one or more portions of the first set of image data into one or more object categories associated with the one or more gas leaks; and
   generating the leak detection model based on the one or more object categories.

4. The method of claim 1, wherein the first set of image data corresponds to a first resolution, and wherein the second set of image data corresponds to a second resolution lower than the first resolution.

5. The method of claim 1, comprising sending an additional command to the device to adjust one or more operations of the device in response to detecting the gas leak, wherein the additional command comprises stopping an operation, changing a speed, modifying an operating parameter, or any combination thereof.

6. The method of claim 1, wherein the second set of image data comprises infrared image data.

7. The method of claim 1, comprising receiving additional image data from multiple imaging devices.

8. The method of claim 1, comprising receiving additional data from other data sources within an environment, wherein the received data comprises information identifying the type of equipment, a project identifier, or both.

9. The method of claim 1, comprising associating, via the leak detection model, one or more visual characteristics of the gas leak in the second set of image data with at least one of the one or more features.

10. A system for detecting gas leaks in image data, comprising:
    one or more sensors configured to acquire image data of equipment configured to distribute a gas;
    a computing system configured to:
       receive a first set of the image data via the one or more sensors, wherein the first set of the image data is representative of the equipment and a presence of the gas;
       extract one or more features from the first set of the image data, wherein the one or more features are representative of one or more gas leaks associated with the equipment, wherein the one or more features are identified by applying a mask regional convolutional neural network to the first set of the image data to determine one or more candidate object bounding boxes associated with the one or more gas leaks;
       generate a leak detection model based on the one or more features, wherein the leak detection model correlates the extracted features of the one or more gas leaks with a corresponding calibrated output of the leak detection model, wherein the leak detection model provides a weight for each correlation corresponding to a strength of the correlation;
       receive a second set of the image data;
       identify a type of the equipment depicted in the second set of the image data;
       identify that the leak detection model is associated with the equipment based on the type of the equipment;
       training the leak detection model to accurately detect the one or more gas leaks based on the second set of image data provided to the leak detection model, wherein the second set of image data is associated with a test image;

determine whether a gas leak is present on the equipment based on the second set of image data and the trained leak detection model;

in response to determining that the trained leak detection model accurately detects leaks based on the second set of image data and the gas leak is present, send a notification indicative of the one or more gas leaks to a computing device; and send a command to a device to cause the device to close to prevent gas from being supplied to the one or more gas leaks.

11. The system of claim 10, wherein the computing system is configured to send an additional command to the device to stop operation in response to determining that the gas leak is present, wherein the command comprises stopping an operation, changing a speed, modifying an operating parameter, or any combination thereof.

12. The system of claim 10, wherein the computing system is configured to acquire a third set of the image data representative of the equipment from the one or more sensors in response to determining that the gas is not leaking from the equipment.

13. The system of claim 10, where in the image data comprises infrared image data.

14. The system of claim 10, wherein the one or more sensors are configured to detect heat, pressure, or both.

15. A tangible, non-transitory, computer-readable medium, comprising computer-readable instructions that, when executed by one or more processors, cause the one or more processors to:

receive a first set of image data representative of equipment configured to distribute a gas;

determine a type of the equipment depicted in the first set of image data;

extract one or more features from an additional set of image data acquired before the first set of image data, wherein the one or more features are representative of one or more gas leaks associated with other equipment different from the equipment, wherein the other equipment and the equipment is of the same type, wherein the one or more features are identified by applying a mask regional convolutional neural network to the additional set of image data to determine one or more candidate object bounding boxes associated with the one or more gas leaks;

generate a leak detection model based on the one or more features, wherein the leak detection model correlates the extracted features of the one or more gas leaks with a corresponding calibrated output of the leak detection model, wherein the leak detection model provides a weight for each correlation corresponding to a strength of the correlation;

receive a second set of the image data;

determine a type of the equipment depicted in the second set of the image data;

retrieve the leak detection model based on the type of the equipment depicted in the second set of image data;

training the leak detection model to accurately detect the one or more gas leaks based on the second set of image data provided to the leak detection model, wherein the second set of image data is associated with a test image;

in response to determining that the trained leak detection model accurately detects leaks based on the second set of image data;

determine that one or more additional gas leaks is present on the equipment based on the second set of image data and the trained leak detection model;

send a notification to a computing device in response to detecting the one or more additional gas leaks; and send a command to a device to cause the device to close to prevent gas from being supplied to the one or more gas leaks.

16. The tangible, non-transitory, computer-readable medium of claim 15, wherein the first set of image data corresponds to a first resolution, and wherein the second set of image data corresponds to a second resolution lower than the first resolution.

17. The tangible, non-transitory, computer-readable medium of claim 15, wherein the first set of image data and the second set of image data comprise infrared image data.

18. The tangible, non-transitory, computer-readable medium of claim 15, comprising the computer-readable instructions that, when executed by the one or more processors, cause the one or more processors to send a command to the device to adjust one or more operations in response to detecting a third gas leak.

19. The tangible, non-transitory, computer-readable medium of claim 15, wherein the instructions, when executed by the one or more processors, cause the one or more processors to evaluate a performance of the leak detection model by predicting properties of the gas leak using a reported intersection over union (IoU) evaluation metric.

20. The tangible, non-transitory, computer-readable medium of claim 15, wherein the instructions, when executed by the one or more processors, cause the one or more processors to calibrate one or more parameters of the leak detection model based on a discrepancy between one or more predicted gas leak properties and one or more respective actual gas leak properties.

* * * * *